(12) United States Patent
Yoshida et al.

(10) Patent No.: US 9,906,008 B2
(45) Date of Patent: Feb. 27, 2018

(54) BUS BAR CONNECTION DEVICE AND SWITCHGEAR INCLUDING THE SAME

(71) Applicant: Mitsubishi Electric Corporation, Tokyo (JP)

(72) Inventors: Tadahiro Yoshida, Tokyo (JP); Naoaki Inoue, Tokyo (JP); Takatoshi Otsubo, Tokyo (JP)

(73) Assignee: MITSUBISHI ELECTRIC CORPORATION, Chiyoda-Ku, Toyko (JP)

( * ) Notice: Subject to any disclaimer, the term of this patent is extended or adjusted under 35 U.S.C. 154(b) by 0 days.

(21) Appl. No.: 15/037,297

(22) PCT Filed: Oct. 6, 2014

(86) PCT No.: PCT/JP2014/076687
§ 371 (c)(1),
(2) Date: May 17, 2016

(87) PCT Pub. No.: WO2015/076029
PCT Pub. Date: May 28, 2015

(65) Prior Publication Data
US 2016/0294174 A1    Oct. 6, 2016

(30) Foreign Application Priority Data
Nov. 19, 2013 (JP) .................. 2013-238971

(51) Int. Cl.
*H02G 5/00* (2006.01)
*H02B 13/00* (2006.01)
(Continued)

(52) U.S. Cl.
CPC ........... *H02G 5/007* (2013.01); *H02B 13/005* (2013.01); *H01R 13/53* (2013.01); *H02B 1/22* (2013.01)

(58) Field of Classification Search
CPC ........................................ H02B 13/005–13/01
See application file for complete search history.

(56) References Cited

U.S. PATENT DOCUMENTS 5,041,004 A * 8/1991 Waldorf .................. F16B 31/02
439/306
6,485,329 B2 * 11/2002 Eppe ......................... H02B 1/04
439/570
(Continued)

FOREIGN PATENT DOCUMENTS

DE        94 21 443 U1     11/1995
DE        198 38 356 A1     2/2000
(Continued)

OTHER PUBLICATIONS

International Search Report (PCT/ISA/210) dated Jan. 6, 2015, by the Japanese Patent Office as the International Searching Authority for International Application No. PCT/2014/076687 (six pages).
(Continued)

*Primary Examiner* — Robert J Hoffberg
(74) *Attorney, Agent, or Firm* — Buchanan Ingersoll & Rooney PC

(57) ABSTRACT

A bus bar connection device for a switchgear has a first bushing with an internal stem conductor whose end is a first connection surface at a nose of the bushing. The bus bar connection device has a second bushing with an internal stem conductor whose end is a second connection surface at a nose of the bushing. The first connection surface of the first bushing is placed opposite the second connection surface of the second bushing, the axis of the first bushing being identical to the axis of the second bushing. A connection element electrically connects the first connection surface with the second connection surface. A cylindrical insulation
(Continued)

adapter surrounds the nose of the first bushing, the nose of the second bushing, and the connection element as one.

16 Claims, 13 Drawing Sheets

(51) Int. Cl.
  *H01R 13/53* (2006.01)
  *H02B 1/22* (2006.01)

(56) References Cited

U.S. PATENT DOCUMENTS

| | | | |
|---|---|---|---|
| 7,473,847 B2 * | 1/2009 | Sainz De La Maza Escobal | H02B 13/0356 174/74 R |
| 8,629,367 B2 * | 1/2014 | Zwicky | H02B 13/005 218/68 |
| 9,385,493 B2 * | 7/2016 | Maroney | H01R 25/162 |
| 9,461,387 B2 * | 10/2016 | Heilersig | H02B 13/005 |
| 9,660,402 B2 * | 5/2017 | Maroney | H01R 25/162 |

FOREIGN PATENT DOCUMENTS

| | | | |
|---|---|---|---|
| EP | 0 199 249 A1 | 10/1986 | |
| EP | 0 199 891 A2 | 11/1986 | |
| EP | 0 891 013 A1 | 1/1999 | |
| EP | 1 463 174 A1 | 9/2004 | |
| EP | 0 891 013 B1 | 4/2006 | |
| EP | 2028737 A1 * | 2/2009 | ........... H02B 13/005 |
| JP | 04-6216 U | 1/1992 | |
| WO | 99/45617 A1 | 9/1999 | |
| WO | 2004/051816 A1 | 6/2004 | |
| WO | WO 2004/049530 A1 | 6/2004 | |

OTHER PUBLICATIONS

Written Opinion (PCT/ISA/237) issued on Jan. 6, 2015, by the Japanese Patent Office as the International Searching Authority for International Application No. PCT/2014/076687 (three pages).

Extended European Search Report dated May 16, 2017 in corresponding European Patent Application No. 14864182.2.

* cited by examiner

BUS BAR CONNECTION DEVICE AND SWITCHGEAR INCLUDING THE SAME

FIELD OF THE INVENTION

The present invention relates to a switchgear for a power delivery system.

BACKGROUND OF THE INVENTION

A gas insulated switchgear is generally composed of a plurality of switchgear units. To connect a main bus of a switchgear unit with that of its neighboring unit, a known way is to place a bus bar connection device that connects them (see Patent Reference 1). The bus bar connection device has insulation bushings at its both ends. Each insulation bushing has its inside shape like a cup and has an end of the main bus conductor in it. Each insulation bushing is placed on the housing side wall of the switchgear unit, with its nose passing through the wall into the unit. Each insulation bushing is placed so that one inside cup is opposite the other. To make a conjugate connection of conductor terminals inside both bushing cups, an insulation adapter with an axial conductor in it is inserted into both bushing cups.

PRIOR ART

Patent Reference

[Patent Reference 1]
EP Publication No. EP0891013 (B1) (FIG. 1 to FIG. 3)

SUMMARY OF THE INVENTION

Problems to be Solved by the Invention

The bus bar connection device of Patent Reference 1 has a sliding surface for each of two insulation bushings, so that it requires many parts to form those sliding surfaces.

It is an object of the invention to eliminate above problem. It achieves the reduction of constituent parts for the bus bar connection device and the switchgear including the same.

Solution to Problems

A bus bar connection device of the invention includes a first bushing with an internal stem conductor, whose end is a first connection surface, stuck out of a nose of the bushing. The bus bar connection device includes a second bushing with an internal stem conductor, whose end is a second connection surface, stuck out of a nose of the bushing. The first connection surface of the first bushing is placed opposite the second connection surface of the second bushing, both bushings having the same axis. The bus bar connection device includes a connection element connecting the first connection surface with the second connection surface electrically. The bus bar connection device has a tube-like insulation adapter with a cavity inside to surround the nose of the first bushing, the nose of the second bushing, and the connection element as one. The adapter has an encircling channel, broaden radius part, at an inner surface of the adapter. A surface of the encircling channel is a conductive layer. The width of the encircling channel is sufficient to cover the connection element. The adapter has its narrowest inner diameter smaller than the outer diameter of the connection element. A bank of the encircling channel is pushed toward an end of the adapter by an edge of the connection element.

Effect of the Invention

In the invention, a bus bar connection device has one sliding surface, so that it has its reduced main bus line resistivity and reduced number of its constituent parts.

DESCRIPTION OF EMBODIMENTS

Embodiment 1

Figure 1:
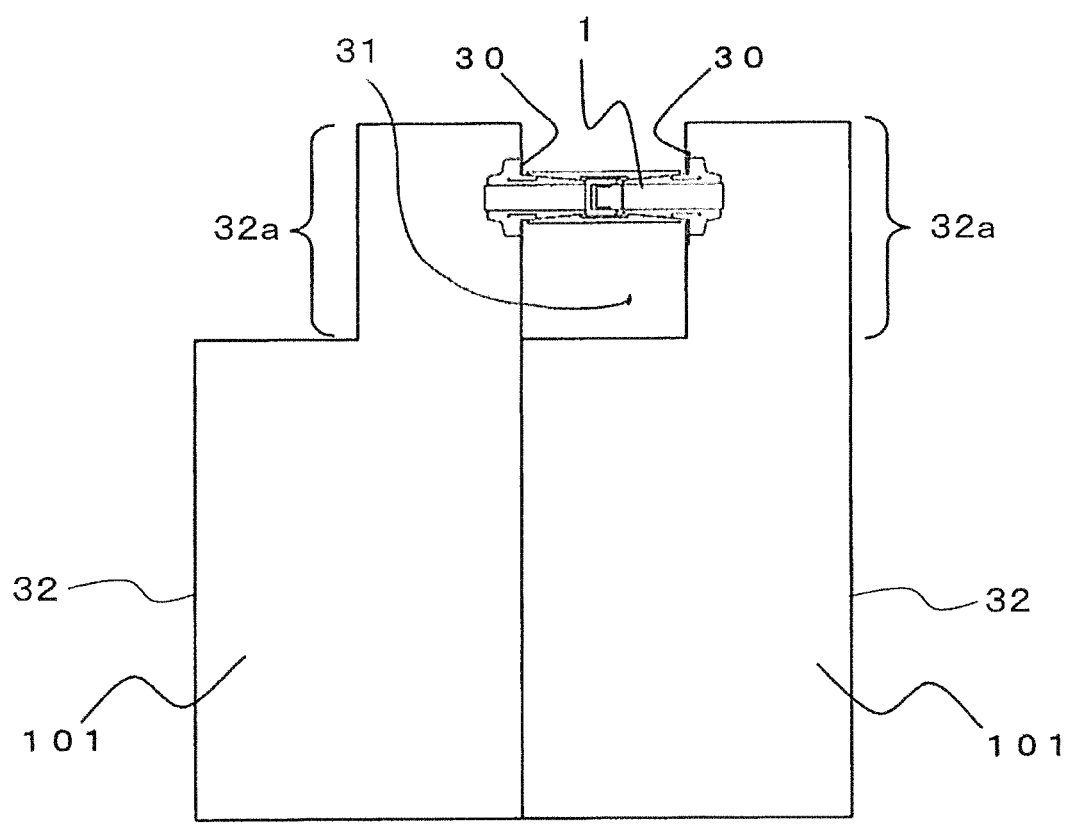
FIG. 1 is a cross sectional front view showing a bus interconnection of a switchgear of Embodiment 1 of the present invention.
Figure 2:
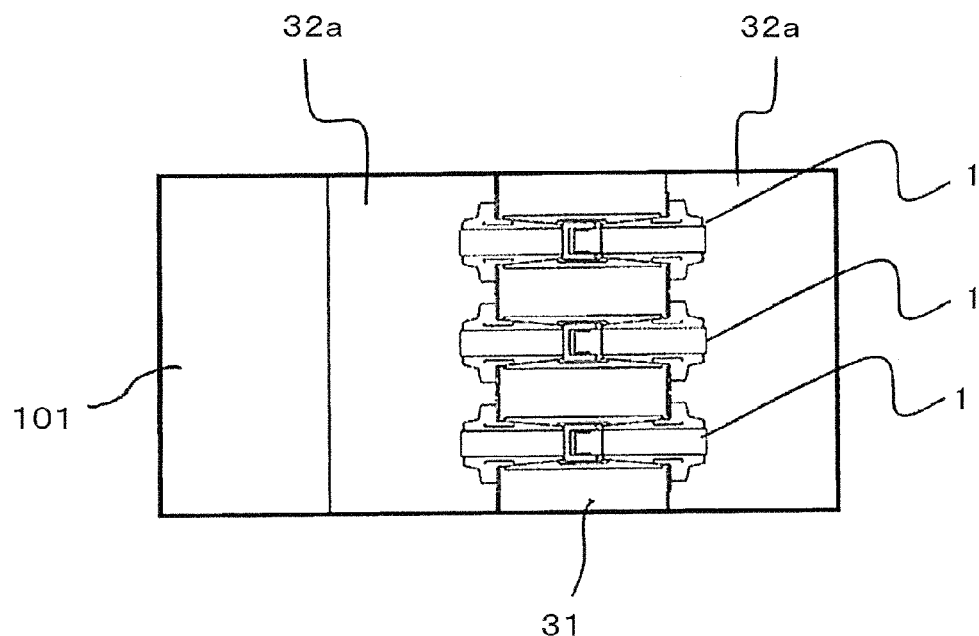
FIG. 2 is a cross sectional top view showing a bus interconnection of a switchgear of Embodiment 1 of the present invention.

FIG. 1 and FIG. 2 show a switchgear of Embodiment 1 of the present invention. FIG. 1 is a cross sectional front view showing bus bar connection devices of the switchgear mainly. FIG. 2 is a cross sectional top view of it. In FIG. 1, a switchgear unit 101 has a cubic pressurized tank 32 with its upper part width narrowed compared to its lower part, so that its cross sectional front shape is like a letter L. The switchgear for electrical distribution system is a combination of these switchgear units 101. A plurality of switchgear units are arranged in line, a direction going from left to right in FIG. 1.

A gas insulated switchgear has insulation gas packed in the pressurized tank. Unlike a gas insulated switchgear, a usual dry air insulated switchgear possibly includes a simple chamber with no insulation gas packed in it instead of above pressurized tank 32.

A bus bar connection device 1 is placed from left to right in FIG. 1 so that it connects a switchgear unit 101 with its neighbor. The bus bar connection device 1 is placed in an interconnection space 31 of pressurized tanks. The interconnection space is a space between narrowed portions 32a of pressurized tanks. The narrowed portion 32a is an upper part of a switchgear unit with its width of a pressurized tank 32 narrowed compared to the overall width of the switchgear unit 101.

Figure 3:
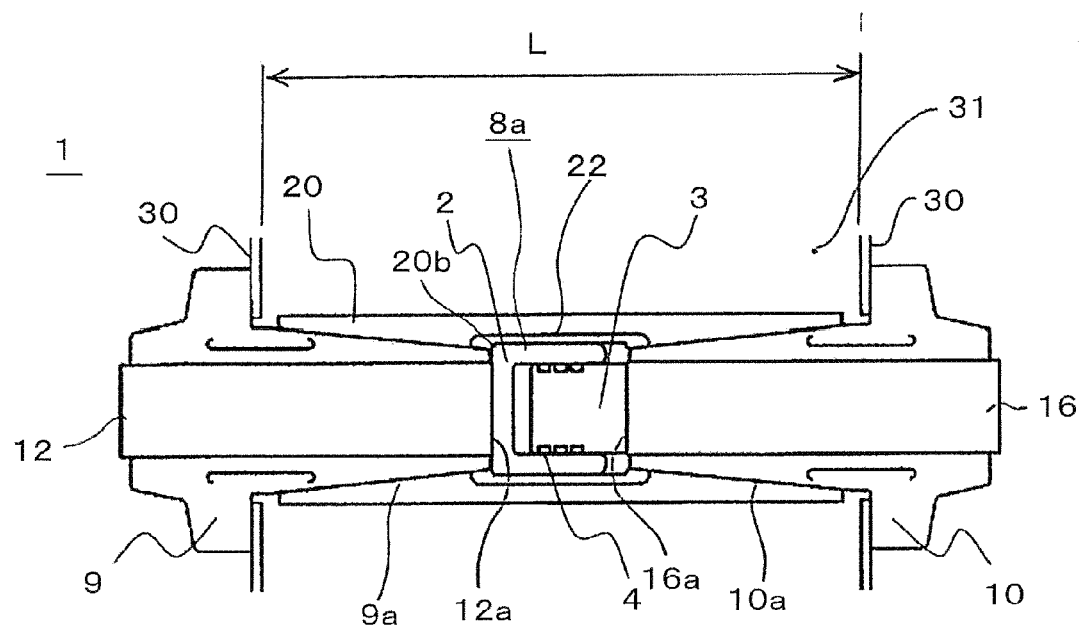
FIG. 3 is a cross sectional side view showing a bus bar connection device of Embodiment 1 of the present invention.
Figure 4:
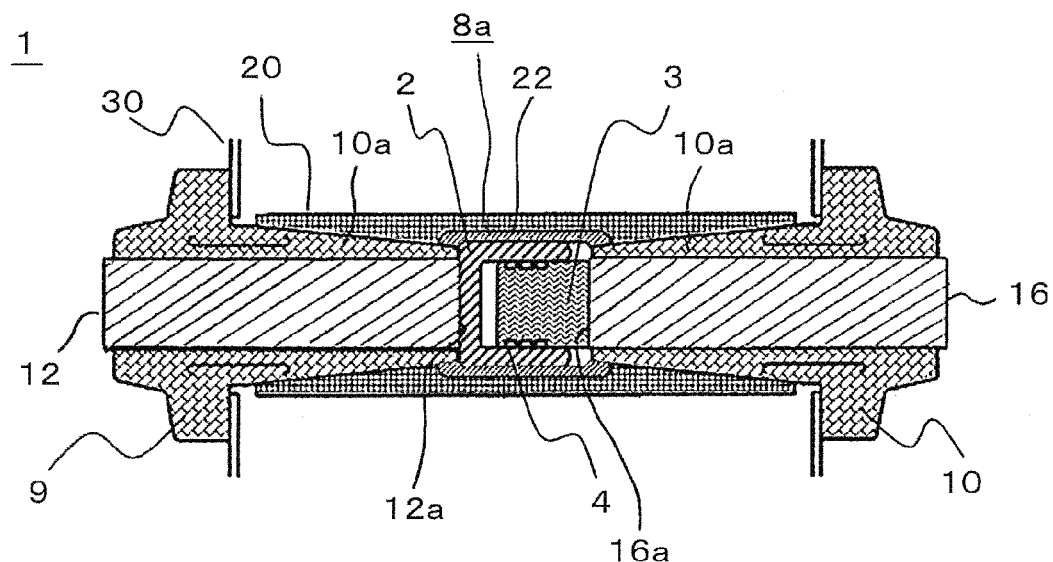
FIG. 4 is a hatched version of FIG. 3.
Figure 5:
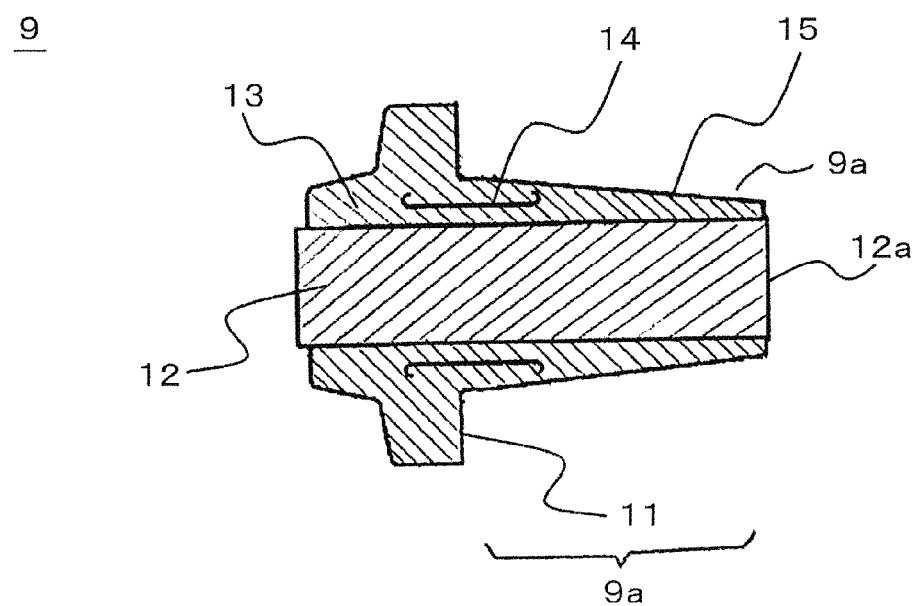
FIG. 5 is a cross sectional side view showing a bushing of Embodiment 1 of the present invention.
Figure 6:
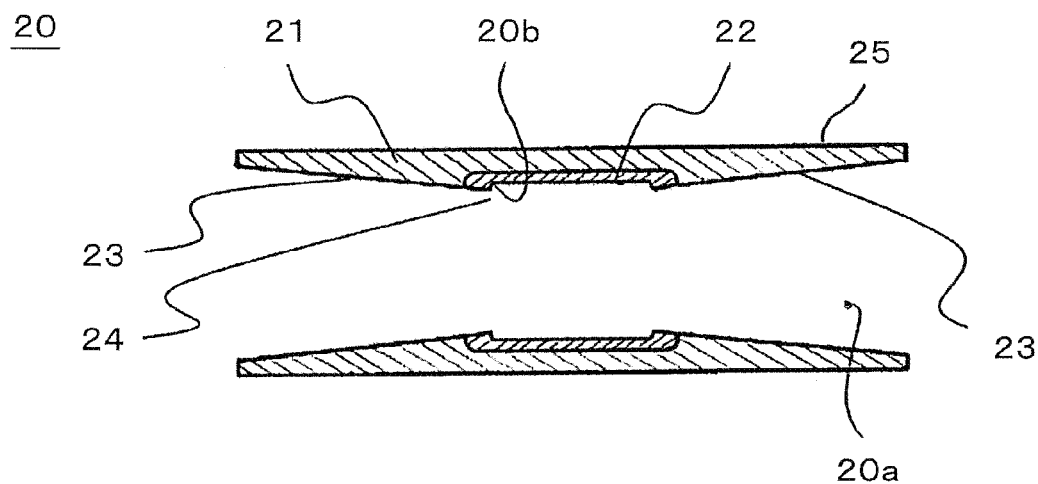
FIG. 6 is a cross sectional side view showing an adapter of Embodiment 1 of the present invention.

FIG. 3 is a cross sectional view showing a bus bar connection device 1 to realize Embodiment 1 of the present invention. FIG. 5 is a cross sectional view showing a bushing 9, a constituent part of the bus bar connection device 1. FIG. 6 is a cross sectional view showing an adapter 20, a constituent part of the bus bar connection device 1. FIG. 4 is a hatched drawing of FIG. 3 for easy understanding of the invention.

As shown in FIG. 3, the bus bar connection device 1 is attached to the walls 30 of the neighboring switchgear units 101. The first bushing 9, a left one, is placed with its nose 9a facing a nose 10a of a second bushing 10, a right one. The first bushing 9 includes an internal stem conductor 12 sticking through it with its end, a first connection surface 12a, out of the nose 9a of the first bushing 9. The second bushing 10 includes an internal stem conductor 16 sticking through it with its end, a second connection surface 16a, out of the nose 10a of the second bushing 10. The first connection surface 12a faces the second connection surface 16a.

The bus bar connection device includes an open-ended socket conductor 2, whose shape is like a cup, on the first connection surface 12a, while it has a plug conductor 3 on the second connection surface 16a.

The head of the plug conductor 3 has a fitting shape capable of inserting into the socket conductor 2 and sliding in it.

The plug conductor 3 includes one or several sliding contacts 4 around its head. Each sliding contact slides keeping contact with the inner surface of the socket conductor 2 and becomes a path of an electric current. The bus bar connection device includes a cylindrical adapter 20 made of insulation material. The tube-like adapter surrounds the nose 9a of the first bushing 9, the nose 10a of the second bushing 10, the socket conductor 2, and the plug conductor 3.

Here the combination of the socket conductor 2, plug conductor 3, and the sliding contacts 4 is called a connection element 8a. The connection element 8a is a path of an electric current going from the internal stem conductor 12 in the first bushing 9 to the internal stem conductor 16 in the second bushing 10.

The socket conductor 2 is fixed by a bolt (not depicted) onto the first connection surface 12a of the internal stem conductor 12, which sticks out of the nose 9a of the first bushing 9. The bolt is screwed down along the axis of the internal stem conductor 12. The plug conductor 3 is fixed by a bolt (not depicted) onto the second connection surface 16a of the internal stem conductor 16, which sticks out of the nose 10a of the second bushing 10. The bolt is screwed down along the axis of the internal stem conductor 16.

FIG. 5 shows a structure of the bushing. Only the structure of the first bushing 9 is to be described, since the structure of the second bushing 10 is the same. The first bushing 9 has a flange 11 that touches the wall 30 of the switchgear unit 101 when mounting. The body of the bushing is called an insulation layer 13, which is made of epoxy resin etc. The insulation layer 13 isolates the internal stem conductor 12 from surroundings. The bushing also includes a shield 14 made of a copper mesh or conductive plastic etc.

The shield keeps a constant distance from the internal stem conductor 12, and has an effect of preventing an electric field concentration between the conductor 12 and the edge of a window of the wall 30 of the pressurized tank 32. The bushing has a tapered surface 15, which constitutes interface insulation against the inner surface of the cylindrical adapter 20.

The internal stem conductor 12 is made of copper alloy or aluminum alloy. The end of the internal stem conductor 12 is the first connection surface 12a, which is connected electrically with the second connection surface 16a of the opposite internal stem conductor 16 through the connection element 8a.

FIG. 6 shows a cross sectional structure of the cylindrical adapter. The adapter 20 is made of insulation material such as silicone rubber. The adapter 20 has an insulation layer 21 that has a sufficient thickness and a proper shape to keep insulation performance. The adapter 20 surrounds the socket conductor 2, and has a shape to hold the socket conductor 2 inside.

The cylindrical adapter 20 also has a cylindrical conductive layer 22 on its inner side. The conductive layer 22 has an effect of preventing an electric field concentration near the nose tip of two bushing 9 and 10. The conductive layer 22 is made of conductive material such as conductive rubber. The conductive layer 22 has an enough length to cover two connection surfaces, that is, the first connection surface 12a of the internal stem conductor 12 in the first bushing 9 and the second connection surface 16a of the internal stem conductor 16 in the second bushing 10.

At the cylindrical conductive layer 22, the adapter has its inner diameter approximately the same as the outer diameter of the socket conductor 2. The inner diameter at the conductive layer 22 is larger than the inner diameter at a rim 24. The rim 24 is an edge of a bank of an encircling channel inside the adapter 20 at the conductive layer 22. The encircling channel is a broaden-radius part near the middle of the cavity 20a of the cylindrical adapter 20. When the bushing etc. is inserted into the adapter 20 under the condition that the socket conductor 2 is fixed to the first connection surface 12a, the bank 20b, which is perpendicular to the axis, of the adapter 20 is pushed toward left in FIG. 3 by the edge of the socket conductor 2.

The adapter 20 has tapered surfaces 23 inside, so that the inner diameter of the adapter 20 is becoming smaller as entering into the cavity 20a for the very middle of the adapter. The tapered surfaces 23 realize interface insulation by making contact with the tapered surface 15 of the first bushing 9 and that of the second bushing 10. Entering into the adapter 20 cavity 20a, the middle-side end of the tapered surface 23 is a circular edge, the rim 24, where the inner diameter is the smallest.

The adapter 20 has a conductive layer 25 outside. The conductive layer 25 is earthed by a grounded clamp (not depicted). The clamp is connected to a part of the conductive layer 25. The grounded conductive layer 25 outside the adapter 20 prevents electric shock in case of touching the bus bar connection device 1 when the switchgear is charged.

The socket conductor 2 is a cup-like conductor and the plug conductor 3 is a conductor rod. Both are made of copper alloy or aluminum alloy. The sliding contacts 4 are arranged in channels along an encircling line on the side surface of the plug conductor 3. The sliding contact 4 is made of copper alloy. One possible structure of a sliding-contact set is a circular arrangement of large numbers of louver shaped strips. Another possible structure is a circular placement of a copper alloy coil, such as those described in JP 2010-200394. It also realizes the same function to place sliding contacts 4 in channels on the inner surface of the socket conductor 2.

Figure 7:
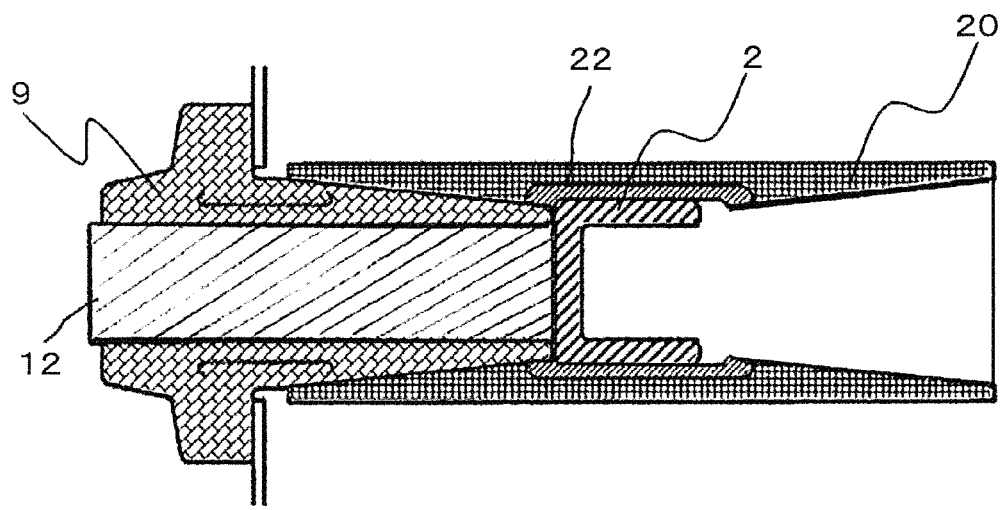
FIG. 7 is a cross sectional side view showing one step in the assembly process of the bus bar connection device of Embodiment 1 of the present invention.

Followings are description of a way to install the bus bar connection device 1 for a system of the switchgear unit 101. FIG. 7 shows one step in the installation process. It is a step when the adapter 20 and the socket conductor 2 are put onto the first bushing 9. In the first step of the installation process, the bushing 9 is inserted into one end of the adapter 20 from left to right in the Figure, putting proper amount of assembly grease on the tapered surfaces 15 and 23.

When the first bushing is just inserted into the adapter 20, the insertion is not kept long to be pulled out, since both of the tapered surface 15 of the bushing 9 and the tapered surface 23 of the adapter 20 enlarge their diameters gradually going toward the reverse direction against the insertion. To avoid this, the socket conductor 2 with assembly grease outside is inserted as it goes toward reverse direction, which is from right to left in FIG. 4, of the bushing 9 insertion from opposite open-end of the adapter 20, and is fixed by a bolt or the like (not depicted) with the first connection surface 12a of the internal stem conductor 12 in the bushing 9 as shown in FIG. 7.

At this time, the insertion is kept long not to be pulled out so that the rim 24 of the adapter 20 and the nose tip of the bushing 9 is placed in the same plane, since the outer diameter of the socket conductor 2 is larger than the inner diameter of the rim 24. The bank 20b of the adapter 20 is pushed toward left in FIG. 7 by the edge of the socket conductor 2 when the socket conductor 2 is fixed to the first connection surface 12a, so that the bushing 9 is not pulled out to fall from the adapter 20 and keeps a connection shown in FIG. 7. Since the conductive layer 22 is made of flexible material such as conductive rubber, it is possible to insert the socket conductor 2 with its outer diameter larger than the inner diameter at the rim 24, widening the rim 24.

In the next step, the second bushing 10 is attached onto the wall 30 of the neighboring switchgear unit 101, and the plug conductor 3 is fixed by a bolt etc. (not depicted) to the end of the internal stem conductor 16 in the bushing 10. Then the switchgear unit 101 is aligned correctly so that the axis of the bushing 10 becomes identical to that of the bushing 9. As the second bushing 10 is inserted into the other end of the adapter 20 as described in FIG. 3, the plug conductor 3 is inserted into the socket conductor 2 for the sliding contacts 4 to make sliding contact, so that the internal stem conductor 12 in the first bushing 9 is connected electrically with the internal stem conductor 16 in the second bushing 10.

The outer dimensions of the switchgear units, especially the distance L between two walls 30 of the switchgear units 101 for the first bushing 9 and the second bushing 10 to be attached onto, should be manufactured accurately so that the tolerance of the L satisfies the design requirements. The relative placement of two bushings 9, 10, and the adapter 20 is defined in accordance with the design of the dimensions of the switchgear.

It is possible for the bus bar connection device 1 described above to achieve its size and cost reduction with reduced number of its constituent parts since it has only one sliding contact interface, which is the interface between the socket conductor 2 and the plug conductor 3. It is also possible for the bus bar connection device 1 to achieve a big reduction of its main bus line resistivity since it has a reduced area of sliding contact, which has a large contact resistivity.

It is possible for the switchgear having the structure described above to achieve the reduction of the outer dimensions of the switchgear units since the switchgear unit has no need to have a connection area to place bus lines in the space other than the pressurized tank 32 in the switchgear unit, though such other space is upper part space or the space lying from the front part to rear in the conventional switchgear unit.

Being installed in a gas insulated switchgear, the bus bar connection device described above also allows a worker to connect a bus line without breaking the seal of the pressurized tank 32 with insulation gas in it. This makes it possible to reduce the gas insulated switchgear installation time since there is no need for field gas treatment, pumping and recharging, at the site of installation.

Adding a means to fix the relative distance L between walls 30 to the switchgear units makes installation processes simpler since it eliminates a need for fine-resizing of the bus bar connection device. The only thing to do is to check whether the plug conductor 3 is inserted into the socket conductor 2 correctly.

Embodiment 2

The bus bar connection device 1 of Embodiment 1 is the bus bar connection device that has a fitting connection of the socket conductor 2 and the plug conductor 3. The bus bar connection device of Embodiment 2 is the bus bar connection device that has two connection conductors 5a, 5b with sliding contacts 6 to constitute a path of an electric current, as described in FIG. 8. The sliding contacts 6 connect two connection conductors like bridges, which differs from Embodiment 1. The sliding contacts 6 are pushed toward the connection conductors by springs to keep constant contact.

The bus bar connection device 1 of Embodiment 2 has a connection conductor 5a, whose radius is smaller than that of the internal stem conductor 12, connected onto the first connection surface 12a of the internal stem conductor 12 in the first bushing 9. The bus bar connection device 1 also has a connection conductor 5b, whose radius is smaller than that of the internal stem conductor 16, connected onto the second connection surface 16a of the internal stem conductor 16 in the second bushing 10. Each of the connection conductors 5a and 5b has a bar shape, so that it is sometimes called a connection bar.

Surrounding the sides of two connection bars 5a, 5b, a number of finger-like strips of the sliding contact 6 are placed parallel with their own neighbors. Each sliding contact 6 connects the connection conductor 5a with the connection conductor 5b like a bridge over the gap between them. The sliding contact 6 keeps sliding contact with the sides of the connection bars 5a, 5b, being pushed toward the bars by circular coil springs 7 placed to encircle the cylindrical array of the sliding contacts.

The connection conductor 5a has a narrow radius part and a broad radius part, which means the cross section along its axis is like a letter T. The diameter of its broad radius part, which makes contact with the connection surface 12a of the internal stem conductor 12, is approximately the same as the inner diameter at the conductive layer 22. The diameter of its narrow radius part is needed to be such a value as a set of the connection bars, surrounding sliding contacts 6, and encircling circular coil spring 7 is able to be placed inside the cavity at the conductive layer 22. Since the broad radius part of connection conductor 5a touches the conductive layer 22, the conductive layer 22 has the same potential as the internal stem conductor 12 and the connection conductor 5a.

A combination of the connection conductor 5a, 5b, the sliding contacts 6, and the circular coil spring 7 is called a connection element 8b. A connection element 8b is a path of an electric current between the internal stem conductor 12 in the first bushing 9 and the internal stem conductor 16 in the second bushing 10.

As described above, the electrical connection in the connection element 8b is realized by a structure that keeps sliding contact by means of the finger-like sliding contacts 6 pushed toward contact surfaces by springs. This makes it possible to reduce production cost since manufacturing processes of the constituent parts of the connection element 8b are simpler compared to that of the connection element 8a described in Embodiment 1.

Embodiment 3

Figure 9:
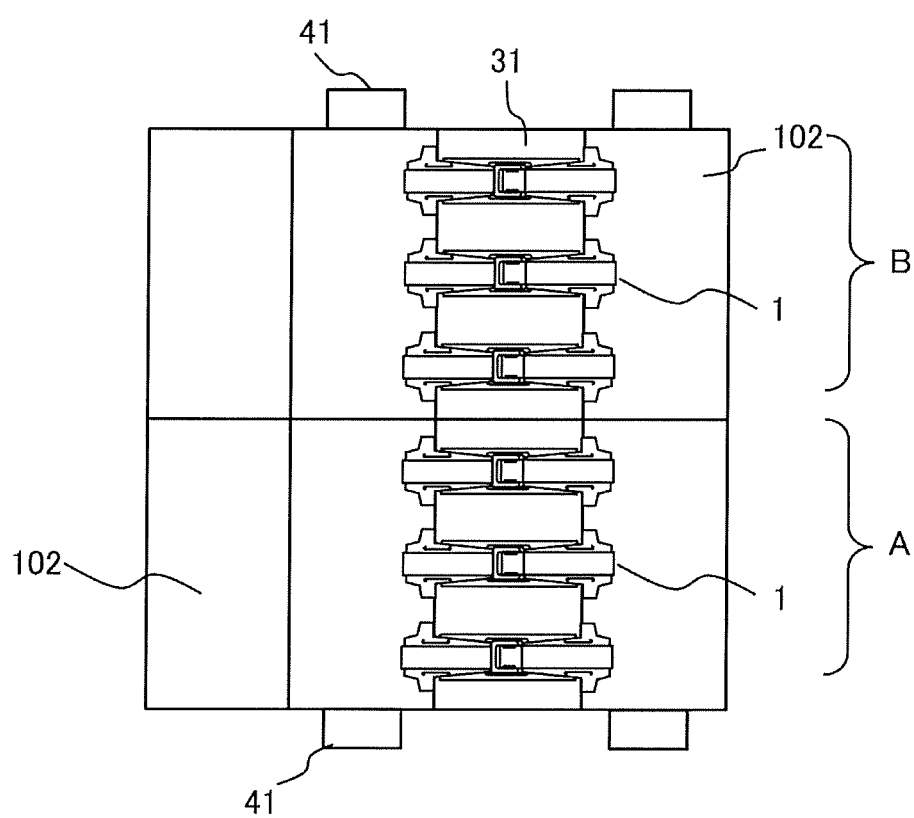
FIG. 9 is a cross sectional top view showing a switchgear of Embodiment 3 of the present invention.
Figure 10:
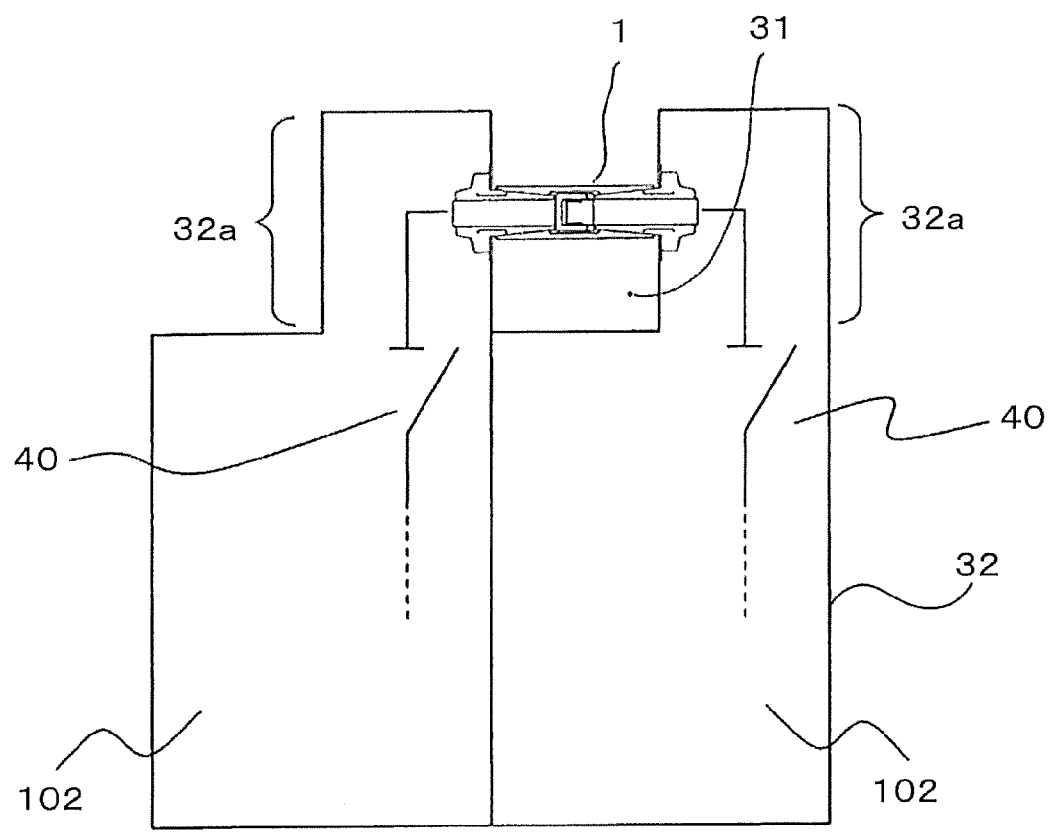
FIG. 10 is a cross sectional front view of FIG. 9.

While the switchgear is a single bus switchgear in Embodiment 1 and 2, a switchgear in Embodiment 3 is a double bus switchgear as described in FIG. 9. FIG. 9 is a cross sectional top view of the switchgear units 102 of Embodiment 3 of the present invention, and FIG. 10 is a cross sectional front view.

FIG. 9 shows a switchgear for a double bus power delivery system. The switchgear has two switchgear units 102 in the first row, and another two units in the second row as shown in FIG. 9, where the first row lies at the front and the second row at the rear. Note that FIG. 9 is a cross sectional top view, which shows the cut plane with the axes of the bus bar connection devices 1 in it. The lower side in FIG. 9 is the front side of the switchgear.

Figure 8:
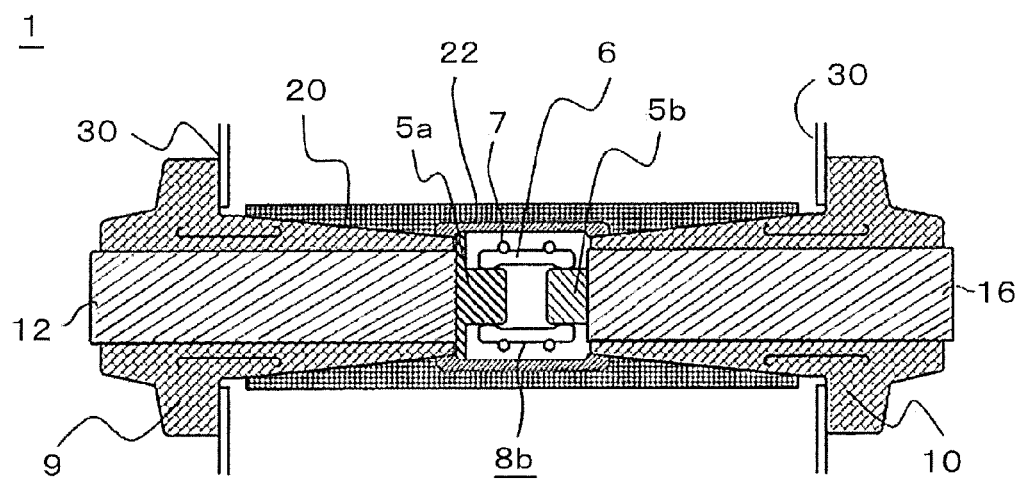
FIG. 8 is a cross sectional side view showing a bus bar connection device of Embodiment 2 of the present invention.

While the bus bar connection device 1 of the embodiment has the same structure as described in FIG. 3, the scope of the invention should not be limited to that, so that it is possible for the embodiment to include the bus bar connection device 1 in FIG. 8.

The bus bar connection device 1 is placed along the line going left to right in FIG. 9, being attached to the switchgear unit 102. The bus bar connection device 1 is placed in the interconnection space 31. The interconnection space is a space between narrowed parts 32a of pressurized tanks, which is same in FIG. 1. The narrowed part 32a is an upper part of the switchgear unit 102 with its width of a pressurized tank 32 narrowed compared to the overall width of the switchgear unit 102. The switchgear units 102 are placed in a manner that each interconnection space 31 is placed right next to that of the neighboring row as shown in FIG. 9. That means the arrangement of the interconnection spaces 31 constitutes a straight channel passing from front side to rear, from lower to upper in FIG. 9.

The bus bar connection devices 1 are placed so that the switchgear has three bus bar connection devices in line in the front row and the other three in the rear. Each of three bus bar connection devices is for each phase of a three phase main bus line. In FIG. 9, the switchgear is a double bus system where the front three phase bus line is called a bus line A and the rear is called a bus line B.

As shown in FIG. 10, it is possible to place a circuit breaker 40 in the switchgear unit 102 to connect to the bus line of the bus bar connection device 1. The operation panel 41 for the circuit breaker is capable to be placed on the front side or the rear of the switchgear unit 102 as shown in FIG. 9.

In the switchgear having a double bus or a ring-bus, it is possible to reduce the size and to achieve cost reduction as a result of reducing constituent parts, when the switchgear of the structure described above is applied.

Embodiment 4

It is same as Embodiment 3 that Embodiment 4 is related to the switchgear for a double bus system, while the placement of the bus bar connection devices 1 in Embodiment 4 is different from that of Embodiment 3.

Figure 11:
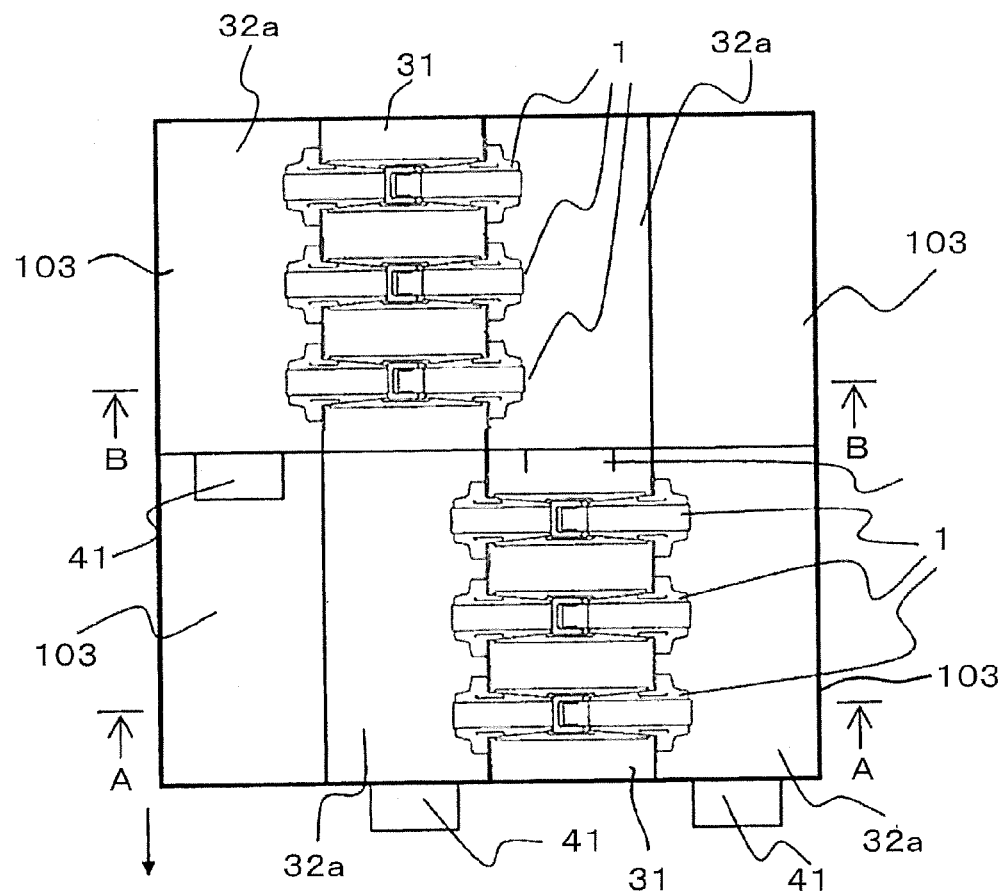
FIG. 11 is a cross sectional top view showing a switchgear of Embodiment 4 of the present invention.

FIG. 11 shows a switchgear for a double bus system. The switchgear has two switchgear units 103 in the first row, and other two units in the second row as shown in FIG. 11, where the first row lies at the front and the second row at the rear. FIG. 11 is a cross sectional top view, which shows the horizontal cut plane with the axes of the bus bar connection devices 1 in it. The lower side in FIG. 11 is the front side of the switchgear.

The bus bar connection device 1 is placed so that it connects two switchgear units 103 in the same row. In detail, the bus bar connection device 1 is placed in the interconnection space 31. The interconnection space is a space between narrowed parts 32a of pressurized tanks. The narrowed part 32a is an upper part of the switchgear unit with its width of a pressurized tank 32 narrowed compared to the overall width of the switchgear unit 103.

Figure 12:
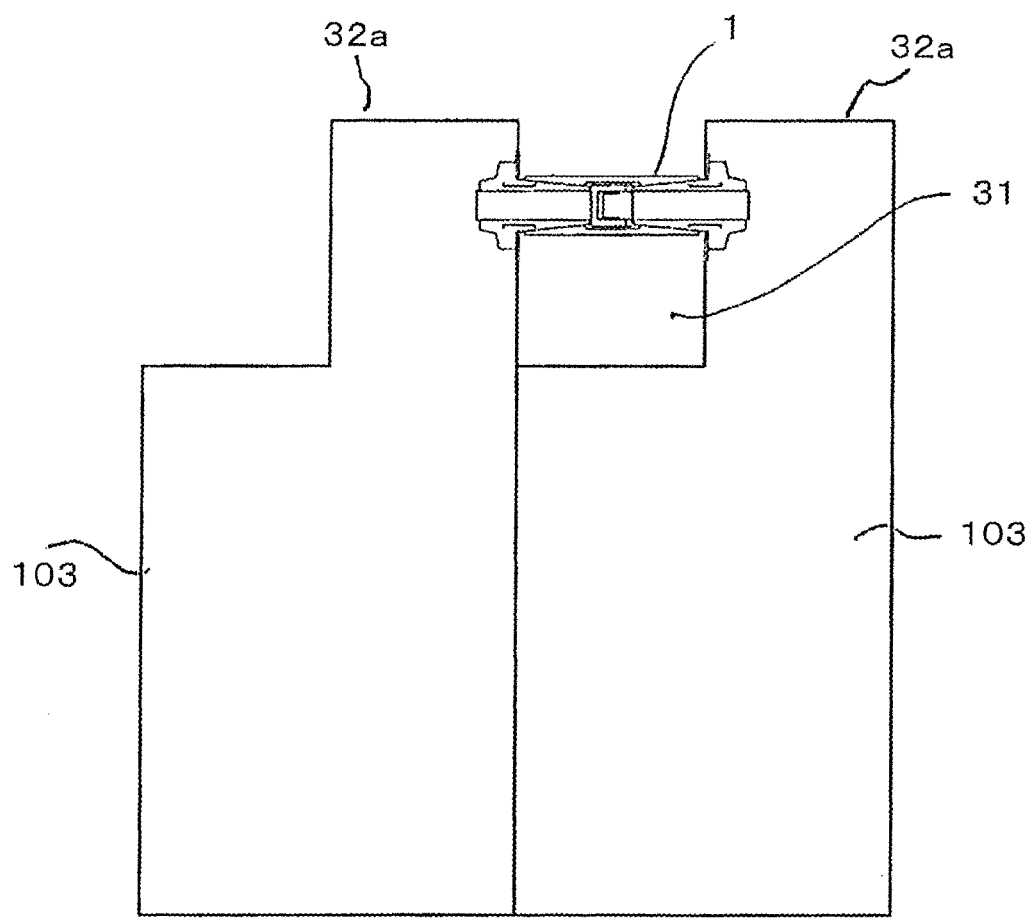
FIG. 12 is a cross sectional front view showing a switchgear of Embodiment 4 of the present invention along the line A-A in FIG. 11.
Figure 13:
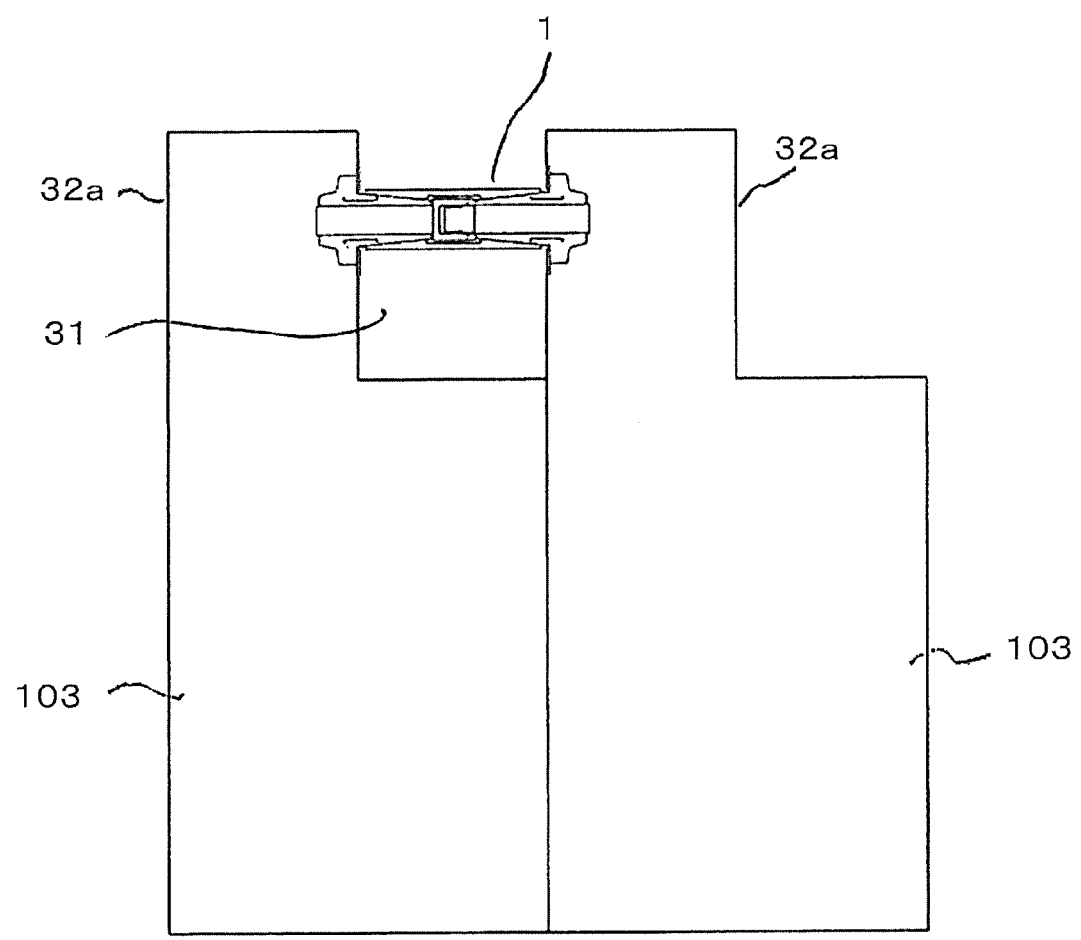
FIG. 13 is a cross sectional front view showing a switchgear of Embodiment 4 of the present invention along the line B-B in FIG. 11.

The switchgear units 103 are placed in a manner that any interconnection space 31 is NOT placed the very next to that of the neighboring row as shown in FIG. 11. That means the interconnection space 31 of the first row constitutes an offset channel against that of the second row, so that any of them does not pass through from front side to rear, from lower to upper in FIG. 11. This is different from the structure of the switchgear composed of the switchgear units 102 of Embodiment 3. (FIG. 12 is a cross section along the line A-A in FIG. 11, while FIG. 13 is that along the line B-B.)

When a circuit breaker 40 to connect to the bus line of the bus bar connection device 1 is placed in the switchgear unit 103, every (four in FIG. 11) operation panel 41 for the circuit breaker is placed facing forward on the side of the switchgear unit 103 as shown in FIG. 11, a top view.

Like Embodiment 3, it is possible for a switchgear to constitute a double bus or a ring-bus, when the switchgear of the structure described above is applied. Since each operation panel 41 is capable to be placed facing forward on the side of the switchgear unit 103, it is also possible to reduce the depth of the switchgear unit 103, so that the operator can treat the circuit breaker 40 with ease by operating the panel 41 standing in front of the switchgear unit.

Embodiment 5

The switchgear of Embodiment 1, 3, and 4 is the system that each switchgear unit is placed in a row and is connected with its neighbors. The switchgear of Embodiment 5 is a system that a switchgear unit has segmented pressurized tanks, an upper pressurized tank 33 and a lower pressurized tank 34, connected to each other by a vertical bus bar connection device 1, as described in FIG. 14.

Figure 14:
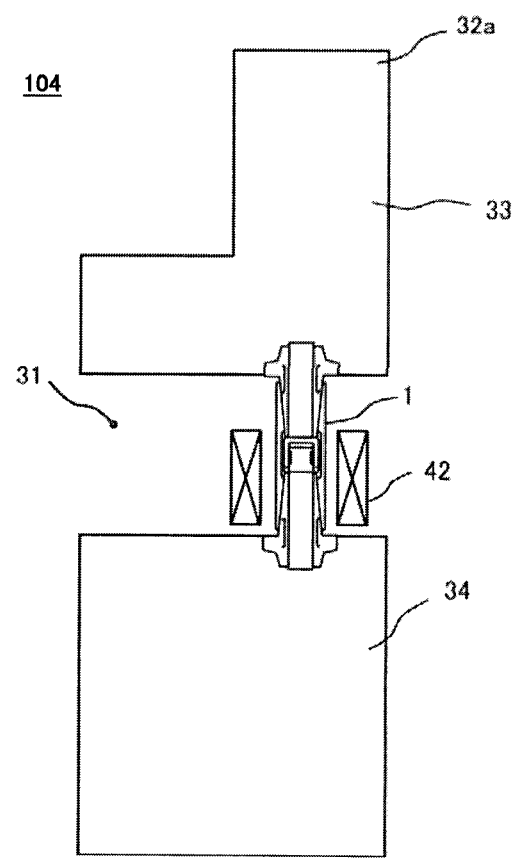
FIG. 14 is a cross sectional front view showing a switchgear of Embodiment 5 of the present invention.

FIG. 14 is a cross sectional front view, in which the vertical cut plane include the axis of the bus bar connection device 1, of the switchgear unit 104 of Embodiment 5 of the present invention.

The switchgear unit 104 has two pressurized tanks. One is an upper pressurized tank 33 and the other is a lower pressurized tank 34, while three bus bar connection devices 1 are placed in the space between them. Each bus bar connection device is for each phase of a three phase main bus, and is placed standing vertically in line from front to rear. A switchgear unit with two pressurized tanks usually has an insulation spacer placed between two pressurized tanks to separate gas compartments, while it is possible to connect the main bus lines in the two pressurized tanks 33, 34 together by placing the bus bar connection device 1 when some distance between the pressurized tanks 33 and 34 is needed.

Though the switchgear unit 104 of the structure described here is a little taller, it is possible for the bus bar connection devices 1 to be encircled by a circular current transformer (CT) 42. Then it becomes possible to measure an electric current of each phase by one current transformer before the main bus line is divided to be distributed to the apparatuses outside the switchgear unit 104. There is no need to measure each distributed current.

Embodiment 6

The Embodiment 6 supplies the structure and the procedure to correct the manufacturing misalignment of the axes of the internal stem conductors 12 and 16 to connect two bushings 9 and 10.

Figure 15:
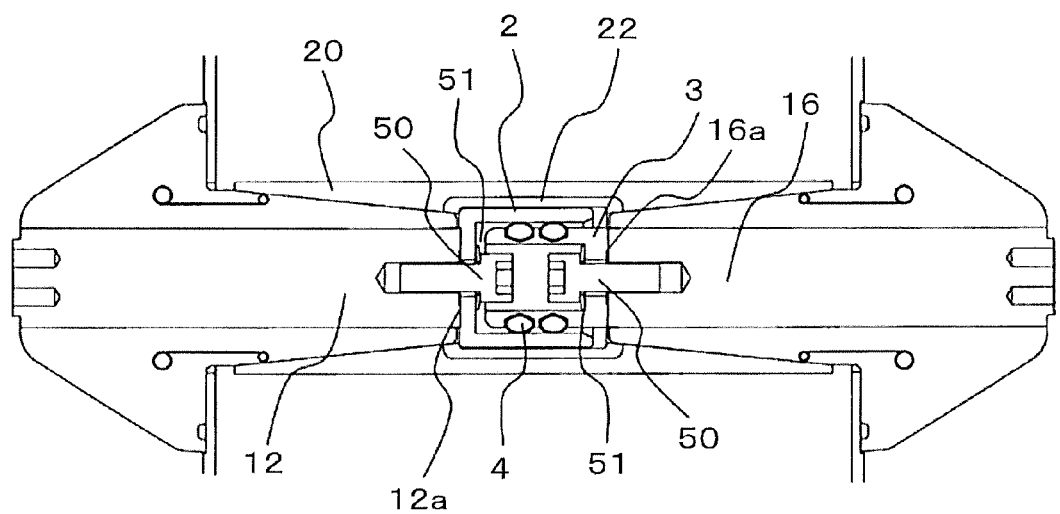
FIG. 15 is a cross sectional side view showing a bus bar connection device of Embodiment 6 of the present invention.
Figure 16:
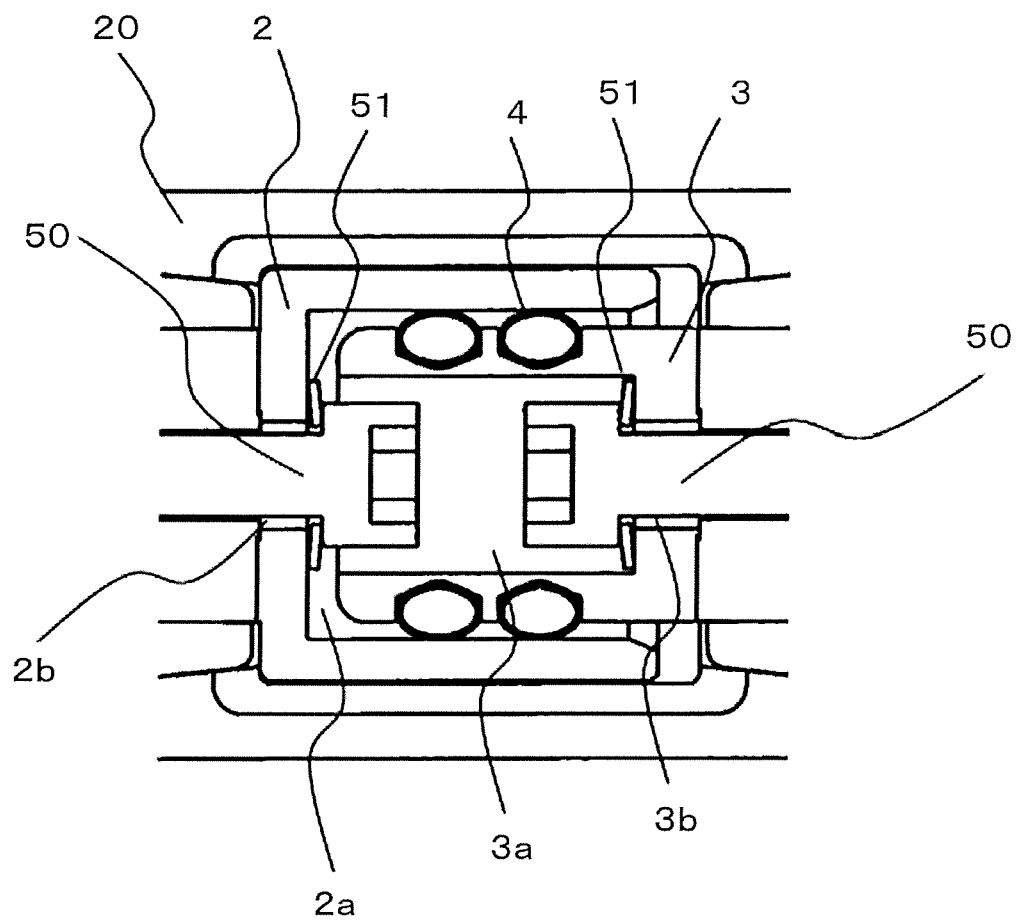
FIG. 16 is a magnified drawing of a part of FIG. 15.

FIG. 15 is a cross sectional side view of a bus bar connection device 1 of the embodiment. FIG. 16 is a magnified drawing of FIG. 15, a cross sectional side view. The socket conductor 2 has its cavity 2a, and the plug conductor 3 has its cavity 3a. Each cross section of the cavities is like a cup. As described in FIG. 15, the inner plug conductor 3 is fitted into the outer socket conductor 2, while the sliding contacts 4 keep contact between them. The socket conductor 2 has a through hole 2b at the bottom of its cavity 2a, and the plug conductor 3 has a through hole 3b at the bottom of its cavity 3a.

The bus bar connection device has the first bolt 50 passing the through hole 2b of the socket conductor 2 and has the second bolt 50 passing the through hole 3b of the plug conductor 3. The first bolt is screwed into the screw hole at the end of the internal stem conductor 12 to connect the socket conductor 2 with the first connection surface 12a of the internal stem conductor 12.

The second bolt is screwed into the screw hole at the end of the internal stem conductor 16 to connect the plug conductor 3 with the second connection surface 16a of the internal stem conductor 16. The bus bar connection device has a first disc spring 51 under the head of the first bolt 50 at the bottom of the cavity 2a of the socket conductor 2. The bus bar connection device has a second disc spring 51 under the head of the second bolt 50 at the bottom of the cavity 3a of the plug conductor 3.

While the through hole 2b of the socket conductor 2 has radial clearance of several millimeters for the first bolt 50 threads, the through hole 3b of the plug conductor 3 has radial clearance of several millimeters for the second bolt 50 threads, so that it is possible to correct the axial misalignment of the bus bar connection device 1 by adjusting positions of the bolts 50 in a plane perpendicular to the axis of the bus bar connection device 1.

That is, it is possible to correct the axial misalignment of the internal stem conductor 16 against the bus bar connection device 1 within a range of the radial difference of the bolt 50 and the through hole 3b of the plug conductor 3.

The diameter of each through hole 2b, 3b is several millimeters, more accurately five millimeters, larger than the outer diameter of the bolt 50 in the embodiment described above, but this value is not intended to limit the scope of the invention. The through hole 2b should have a proper diameter for the disc spring 51 not to be pushed into the through hole 2b and to be able to keep a stable connection of the socket conductor 2 with the internal stem conductor 12 by means of the bolt 50 and the disc spring 51. The through hole 3b should have a proper diameter for the disc spring 51 not to be pushed into the through hole 3b and to be able to keep a stable connection of the plug conductor 3 with the internal stem conductor 16. It is possible to substitute a coil spring, which has the same function, for the disc spring 51. The choice of them depends on the contact pressure and the outer dimensions of the bus bar connection device 1.

As described above, the bus bar connection device has the through hole 2b at the bottom of the cavity 2a of the socket conductor 2 with its diameter larger than the outer diameter of the bolt 50 threads; it has the through hole 3b at the bottom of the cavity 3a of the plug conductor 3 with its diameter larger than the outer diameter of the bolt 50 threads; it has a structure where the socket conductor 2 is connected to the bushing 9 by the disk spring 51 between them; it has a structure where the plug conductor 3 is connected to the bushing 10 by the disk spring 51 between them. These structures make it possible to correct the manufacturing misalignment of the axis of the bus bar connection device 1 in a plane perpendicular to the axis after finishing the manufacturing process.

1: Bus bar connection device
2: Socket conductor
2a: Cavity
2b: Through hole
3: Plug conductor
3a: Cavity
3b: Through hole
4: Sliding contact
5a: Connection conductor
5b: Connection conductor
6: Sliding contact
7: Circular coil spring
8a: Connection element
8b: Connection element
9: Bushing
9a: Nose
10: Bushing
10a: Nose
11: Flange
12: Internal stem conductor
12a: Connection surface
13: Insulation layer
14: Shield
15: Tapered surface
16: Internal stem conductor
16a: Connection surface
20: Adapter
20a: Cavity
20b: Bank
21: Insulation layer
22: Conductive layer
23: Tapered surface
24: Rim
25: Conductive layer
30: Wall
31: Interconnection space
32: Pressurized tank
32a: Narrowed part of a pressurized tank
33: Pressurized tank 34: Pressurized tank
40: Circuit breaker
41: Operation panel
42: Current transformer
50: Bolt
51: Disc spring
101: Switchgear unit
102: Switchgear unit
103: Switchgear unit
104: Switchgear unit

What is claimed is:

1. A bus bar connection device comprising:
a first bushing having a first connection surface that is an end of an internal stem conductor of the first bushing stuck out of a nose of the first bushing;
a second bushing having a second connection surface that is an end of an internal stem conductor of the second bushing stuck out of a nose of the second bushing;
a connection element to electrically connect the first connection surface with the second connection surface;
the first bushing having a same axis as the second bushing;
the first connection surface of the first bushing being placed opposite the second connection surface of the second bushing;
a tubular shaped insulation adapter with a cavity inside to surround the nose of the first bushing, the nose of the second bushing, and the connection element as one;
the tubular-shaped insulation adapter having its narrowest inner diameter smaller than an outer diameter of the connection element;
the tubular-shaped insulation adapter having a broaden-radius encircling channel at an inner surface of the tubular-shaped insulation adapter;
a width of the broaden-radius encircling channel being sufficient to cover the connection element and portions of the first and second bushings; and
a surface of the broaden-radius encircling channel being a conductive layer, the conductive layer covering the connector element and the portions of the first and second bushings.

2. The adapter set forth in claim 1, wherein
a bank of the encircling channel being pushed toward an end of the adapter by an edge of the connection element.

3. The bus bar connection device set forth in claim 1, wherein
the nose of the first bushing protrudes toward the opposing second bushing from a mounting plane of the first bushing, and
the nose of the second bushing protrudes toward the opposing first bushing from a mounting plane of the second bushing.

4. The bus bar connection device set forth in claim 1, wherein
the connection element is fixed to both of the first connection surface and the second connection surface to keep an electrical connection.

5. The bus bar connection device set forth in claim 1, wherein
sliding contact to interconnect the internal stem conductor of the first bushing with the internal stem conductor of the second bushing is limited to only one portion in the connection element.

6. The bus bar connection device set forth in claim 1, wherein the connection element includes a combination of a cup-shaped socket conductor and a bar-shaped plug conductor, the bar-shaped plug conductor being slidably fitted into the cup-shaped socket conductor.

7. The bus bar connection device set forth in claim 1, wherein
the connection element to interconnect the first connection surface with the second connection surface is a combination of a first bar-shaped conductor provided on the first connection surface, a second bar-shaped conductor provided on the second connection surface, and finger-shaped individual sliding contacts making sliding contact over sides of the first and the second bar-shaped conductors.

8. A switchgear comprising:
the bus bar connection device set forth in claim 1 to connect neighboring switchgear units together.

9. The switchgear set forth in claim 8, wherein
a housing of each of the switchgear units has a narrowed part compared to another part of the housing so that an interconnection space is generated between the neighboring switchgear units to place the bus bar connection device in the interconnection space.

10. The switchgear set forth in claim 9, wherein
the housing of each of the switchgear units is a pressurized tank with an insulation gas therein.

11. The switchgear set forth in claim 10, wherein
the interconnection space is a plurality of interconnection spaces, each of the neighboring switchgear units have upper and lower pressurized tank segments, the bus bar connection devices being placed at positions from a front to a rear in a respective one of the interconnection spaces between the upper and lower pressurized tank segments.

12. The switchgear set forth in claim 9, wherein
the bus bar connection device and a current transformer are placed in the interconnection space.

13. The switchgear set forth in claim 8, wherein
a housing of at least one of the switchgear units is divided into segments to have an interconnection space among the segments, the bus bar connection device being placed in the interconnection space.

14. The switchgear set forth in claim 8, wherein
the bus bar connection device is a plurality of bus bar connection devices, the plurality of bus bar connection devices are arranged at positions going from a front to a rear, each of the bus bar connection devices being oriented to connect a switchgear unit of the switchgear units with a neighboring switchgear unit of the switchgear units in a same row.

15. The switchgear set forth in claim 8, wherein
the bus bar connection device is a plurality of the bus bar connection devices, a plurality of three phase bus sets are placed at positions going from a front to a rear, each of the three phase bus sets including three of the bus bar connection devices which constitute one of the three phase bus sets.

16. The switchgear set forth in claim 15, wherein
the bus bar connection devices for the plurality of three phase bus sets are placed set by set along a line going from the front to the rear, each of the three phase bus sets being placed in the line offset from a neighboring set of the three phase bus sets.

* * * * *